(12) United States Patent
Janssen et al.

(10) Patent No.: US 6,995,843 B2
(45) Date of Patent: Feb. 7, 2006

(54) METHOD OF SIMULATING A CLEAR-COAT AND COLOR-MATCHING ARTICLES

(75) Inventors: Jeffrey J. Janssen, Woodbury, MN (US); Gerald R. Franck, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 66 days.

(21) Appl. No.: 10/379,337

(22) Filed: Mar. 4, 2003

(65) Prior Publication Data

US 2004/0065411 A1    Apr. 8, 2004

Related U.S. Application Data

(63) Continuation-in-part of application No. 10/263,119, filed on Oct. 2, 2002.

(51) Int. Cl.
G01J 3/52    (2006.01)
(52) U.S. Cl. ...................................... 356/421
(58) Field of Classification Search ................ 356/421; 427/208.4; 434/98, 105
See application file for complete search history.

(56) References Cited

U.S. PATENT DOCUMENTS

| | | |
|---|---|---|
| 4,104,809 A | 8/1978 | Day et al. |
| 4,379,696 A | 4/1983 | Lerner |
| 4,403,866 A | 9/1983 | Falcoff et al. |
| 4,457,718 A * | 7/1984 | Lerner ......................... 434/98 |
| 4,523,852 A | 6/1985 | Bauer |
| 4,636,805 A | 1/1987 | Toganoh et al. |
| 4,692,481 A | 9/1987 | Kelly |
| 4,795,254 A | 1/1989 | Kravetz |
| 4,887,217 A | 12/1989 | Sherman et al. |
| 4,917,745 A | 4/1990 | Speer |
| 5,120,601 A | 6/1992 | Kotaki et al. |
| 5,217,377 A | 6/1993 | Little, Jr. |
| 5,217,744 A | 6/1993 | Little, Jr. |
| 5,254,192 A | 10/1993 | Speakman |
| 5,342,688 A | 8/1994 | Kitchin et al. |
| 5,371,599 A | 12/1994 | Falcoff et al. |
| 5,567,507 A | 10/1996 | Paff et al. |
| 5,700,515 A | 12/1997 | Rodrigues |
| 5,743,407 A * | 4/1998 | Williams ..................... 434/75 |

(Continued)

FOREIGN PATENT DOCUMENTS

DE    9114530    2/1992

(Continued)

OTHER PUBLICATIONS

*Handbook of Pressure Sensitive Adhesive Technology*, 2nd Edition, 1989, Van Nostrand Reinhold, pp. 585-626 (ISBN 0-442-28026-2).

(Continued)

*Primary Examiner*—Zandra V. Smith
*Assistant Examiner*—Kara Geisel
(74) *Attorney, Agent, or Firm*—Pamela L. Stewart

(57) ABSTRACT

A method of simulating a clear coat applied over a color coat for use in color-matching is described. The method comprising the steps of (a) providing a spray-out card having a first major surface and second major surface; (b) applying a color coat to the first major surface of the spray-out card to form a color coat layer; (c) providing a clear coat simulation film comprising a transparent base film and a pressure sensitive adhesive; and (d) adhering the transparent base film of the clear coat simulation film to the color coat layer with the pressure sensitive adhesive to form a color-matching article. Color-matching article produced in accordance with the method are also described.

10 Claims, 4 Drawing Sheets

U.S. PATENT DOCUMENTS

| | | | |
|---|---|---|---|
| 5,851,583 A | 12/1998 | Kronenwetter | |
| 6,217,934 B1 | 4/2001 | Eilenberger | |
| 6,399,193 B1 * | 6/2002 | Ellison | 428/343 |
| 6,440,551 B1 | 8/2002 | Enniss et al. | |

FOREIGN PATENT DOCUMENTS

| | | |
|---|---|---|
| EP | 0 178 096 B2 | 10/1993 |
| EP | 0 697 101 B1 | 7/1997 |
| EP | 0 949 120 A1 | 10/1999 |
| EP | 1 139 234 A1 | 10/2001 |
| GB | 425 246 | 3/1935 |
| GB | 2 058 387 A | 4/1981 |
| GB | 2 222 478 A | 3/1990 |
| GB | 2330795 | 5/1999 |
| JP | 60 105928 | 6/1985 |
| JP | 03-33135 A1 * | 2/1991 |
| JP | 07-166095 * | 6/1995 |
| JP | 07-166096 * | 7/1995 |
| JP | 8-313350 | 11/1996 |
| JP | 9-249000 | 9/1997 |
| JP | 11-12553 A1 * | 1/1999 |
| WO | WO 88/06532 A1 | 9/1988 |
| WO | WO 93/13160 A1 | 7/1993 |
| WO | WO 00/08426 | 2/2000 |
| WO | WO 00/24575 A1 | 5/2000 |
| WO | WO 00/69985 A1 | 11/2000 |

OTHER PUBLICATIONS

*A Guide to Understanding Color Communication,* X-Rite Corp., 2000.

ASTM D1003-77.

* cited by examiner

METHOD OF SIMULATING A CLEAR-COAT AND COLOR-MATCHING ARTICLES

This application is a continuation-in-part of U.S. Ser. No. 10/263,119, filed Oct. 2, 2002.

FIELD

The invention relates to a method for simulating a clear coat applied over a color coat for use in color-matching of the color coat. The invention also includes color-matching articles produced in accordance with the described method.

BACKGROUND

Color-matching of paint is an important step in the motor vehicle repair and refinishing process. It can also be a time consuming step and expensive step. Typically, motor vehicles are assigned a paint color code by the motor vehicle manufacturer that is used by the paint formulator in generating an initial color coat formulation for repainting a motor vehicle. Once the color coat has been formulated, it must be evaluated by the painter to determine if it an acceptable match to the motor vehicle that is being repaired. One step in the color-matching process is simulating the clear coat layer that is applied over the color coat layer on motor vehicle paints.

One known method for simulating a clear coat for color-matching purposes involves first spraying a color coat onto a spray-out card and then over-coating the color coat with a thin layer of an fluid (e.g., mineral spirits, paint thiner, or a solution of soap and water). The thin layer of fluid functions to simulate the appearance of a clear coat. Another known method for simulating a clear coat involves spraying a color coat onto one major surface of a sheet of transparent polymeric film, for example, polyester film. The color coat is then viewed through the transparent polymeric film with the film acting to simulate a clear coat. The painter may also spray a clear coat layer over the top surface of the color coat layer.

Although the above techniques may be used with some success, each may be improved upon. For example, the fluid method produces only a temporary simulation of a clear coat as the fluid evaporates from the color coat. The polymer film method may be inaccurate, for example, due to the fact that the appearance of the color coat when viewed through the polymer film may be may not accurately reflect the true color of this layer if it were applied to a substrate and allowed to dry exposed to air. This is especially true with metallic or pearlescent paints. The spray-applied clear coat method requires time to allow the clear coat to properly dry and/or cure.

What is desired is a quick and accurate method to simulate a clear coat applied over a color coat for use in color-matching of the color coat.

SUMMARY

The invention provides a method of simulating a clear coat layer applied over a color coat layer for color-matching to a target substrate. The method is particularly useful in guiding a painter in color-matching a color coat formulation to the color of a motor vehicle that is to be painted, for example, during auto body repair.

In one aspect the invention provides a method of simulating a clear coat applied over a color coat. The method comprises the steps of:

(a) providing a spray-out card having a first major surface and second major surface;

(b) applying a color coat to the first major surface of the spray-out card to form a color coat layer;

(c) optionally, allowing the color coat to dry;

(d) providing a clear coat simulation film comprising a transparent base film and a pressure sensitive adhesive;

(e) adhering the pressure sensitive adhesive of the clear coat simulation film to the color coat layer with the pressure sensitive adhesive to form a color-matching article; and (f) optionally, visually comparing the color-matching article with a target substrate, for example, a motor vehicle.

The clear coat simulation film comprises a transparent base film and a pressure sensitive adhesive adhered to the transparent base film. The pressure sensitive adhesive layer may be pre-applied to transparent base film or the pressure sensitive adhesive may be provided in the form of an adhesive transfer tape for application to the transparent base film by the end-user (e.g., painter). In certain embodiments the base film and/or pressure sensitive adhesive are achromic (i.e., colorless).

In certain embodiments a layer of pressure sensitive adhesive layer is applied to the second major surface of the spray-out card. The pressure sensitive adhesive allows the spray-out card to be removably attached to a substrate (e.g., a paint stick, a wall of a spray booth, or a body panel of a motor vehicle). This facilitates application of color coat to the spray-out card and also allows for "hands-free" viewing of the color-matching article as it can be adhered to a surface.

In certain embodiments, the clear coat simulation film includes a low-adhesion backsize layer applied to the transparent base film opposite the adhesive layer. When equipped with a low-adhesion backsize, the clear coat simulation film may be provided in roll form or as a stack of sheets.

In another aspect the invention provides color-matching articles produced in accordance with the method of the invention.

BRIEF DESCRIPTION OF THE DRAWINGS

The present invention will be further described with reference to the accompanying drawings, in which.

DETAILED DESCRIPTION

The present invention provides a method of simulating a clear coat layer applied over a color coat layer for color-matching to a target substrate. The method is particularly useful in guiding a painter in color-matching a color coat formulation to the color of a motor vehicle that is to be painted, for example, during auto body repair. Specifically, the method simulates the visual appearance of a clear coating applied over a color coating to allow a painter to quickly and easily determine whether the color coat is a proper match for the target substrate. Although broadly suitable for all paints, the present invention is particularly useful for simulating a clear coating over metallic and pearlescent paints. In another aspect the invention provides color-matching article produced in accordance with the disclosed method.

Figure 1:
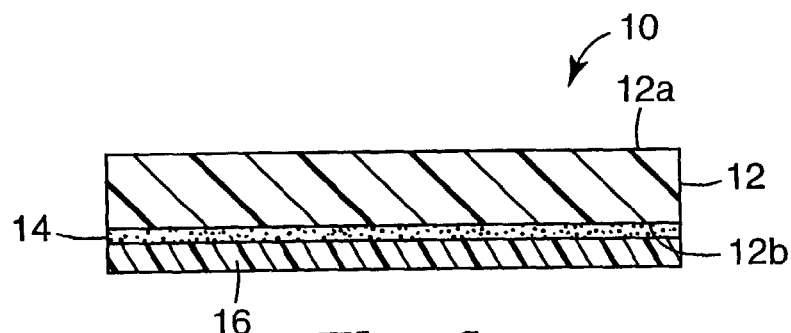
FIG. 1 is a side view of one embodiment of a clear coat simulation film.

Referring now to FIG. 1, a side view of one embodiment of a clear coat simulation film is shown. Clear coat simulation film 10 includes transparent base film 12 having first major surface 12a and second major surface 12b, and adhesive layer 14 adhered to least a portion of second major surface 12b. Adhesive layer 14 may be pre-applied to the transparent base film 12 or the adhesive layer may be provided as an adhesive transfer tape to be applied to the transparent base film 12 by the end user. As shown in FIG. 1, adhesive layer 14 can be covered with a removable release liner 16 that protects the adhesive from contamination until it is removed by the end-user.

Figure 2A:
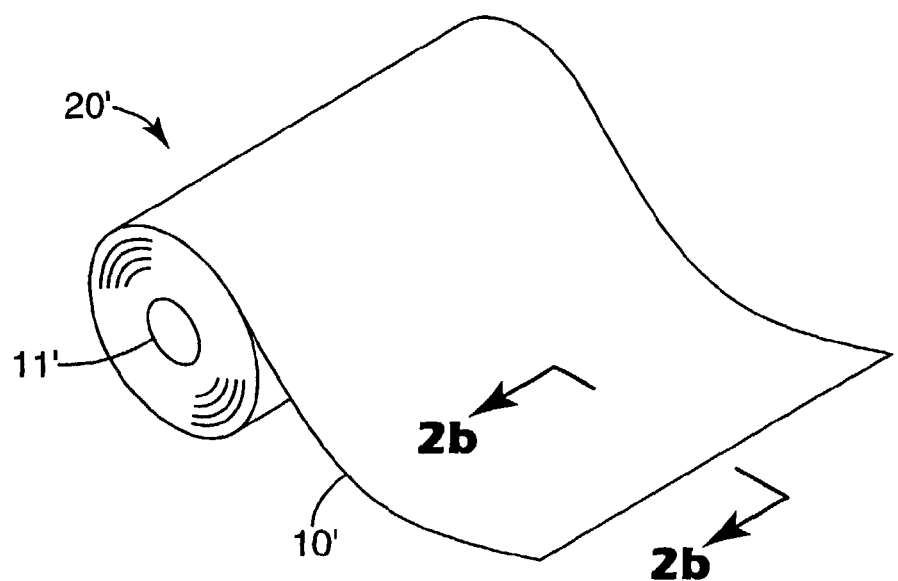
FIG. 2a is a perspective view of one embodiment of a clear coat simulation film.
Figure 2B:
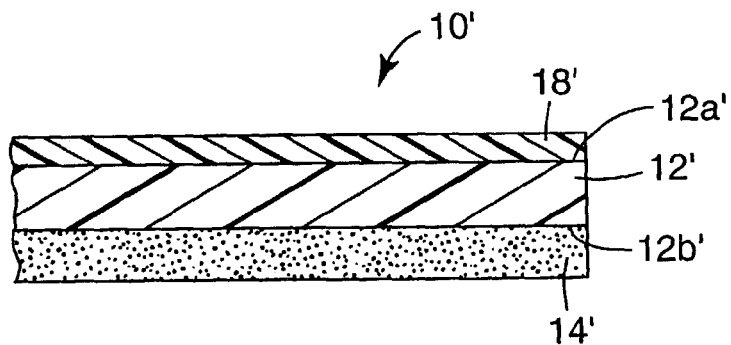
FIG. 2b is a cross-section view of the clear coat simulation film of FIG. 2a taken along line 2b—2b.
Figure 3:
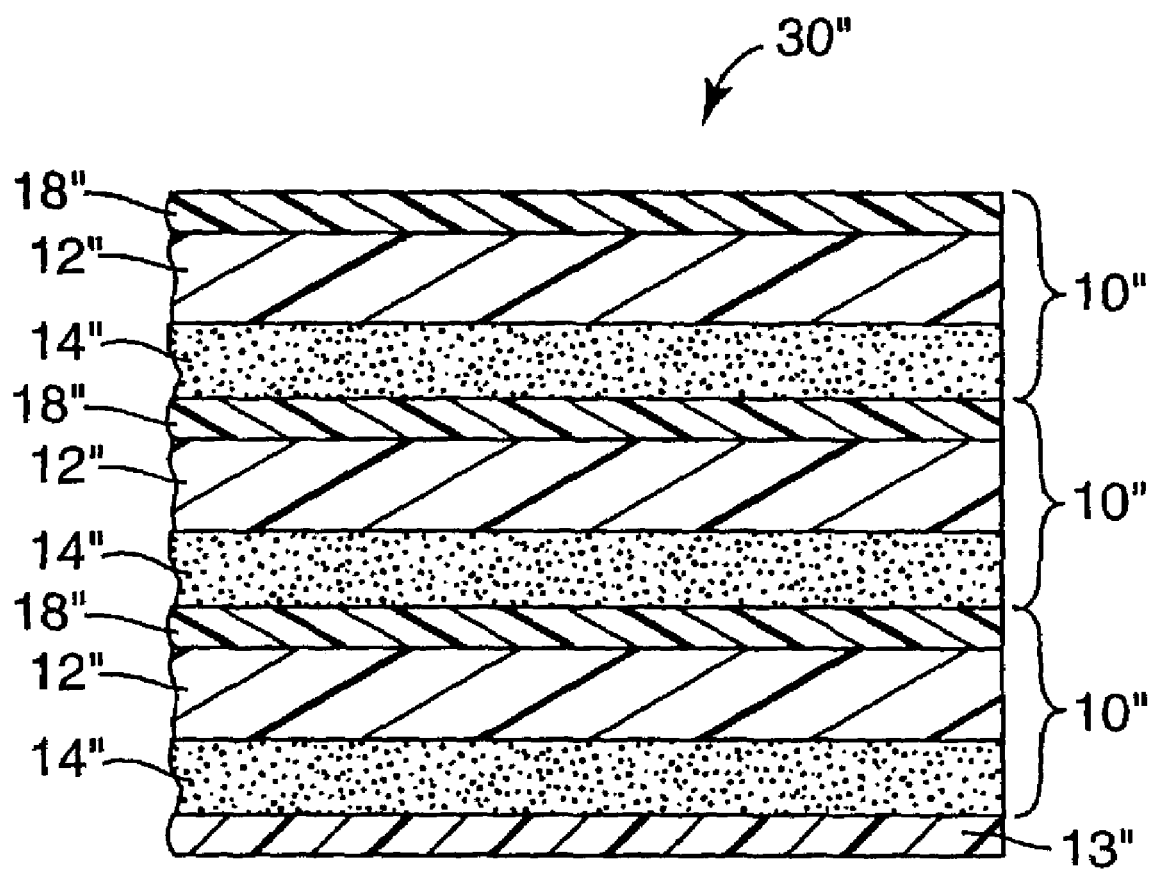
FIG. 3 is a side view of one embodiment of a clear coat simulation film.

In certain embodiments, the clear coat simulation film is provided in roll form or in the form of a stack of sheets. Referring now to FIG. 2a, a length of clear coat simulation film 10' is shown provided in the form of a roll 20' wound around core 11'. As shown in FIG. 2b, clear coat simulation film 10' includes transparent base film 12' and pressure sensitive adhesive layer 14' covering major surface 12b'. Clear coat simulation film 10' further includes low adhesion backsize layer 18' covering major surface 12a'. Low adhesion backsize layer 18' functions to allow pressure sensitive adhesive layer 14' to be easily and cleanly removed from transparent base film 12' when a length of clear coat simulation film 10' is dispensed from roll 20'. Alternatively, as shown in FIG. 3, clear coat simulation film 10" may be provided as a stack 30" of individual sheets of clear coat simulation film 10" on back-up card 13". Each sheet 10" includes transparent base film 12" having a layer of pressure sensitive adhesive 14" and low adhesion backsize layer 18". Each sheet 10" can be individually removed from the stack 30". Optionally, tabs may be included to facilitate removal of a single sheet 10" from the stack 30".

Suitable materials for forming low adhesion backsize layer are known in the art and may be selected, for example, with reference to the type of pressure sensitive adhesive chosen for adhesive layer. Low-adhesion backsize materials include, for example, silicones, long chain branched polymers (e.g., copolymers of alkyl acrylate and acrylic acid, stearyl methacrylate-acrylonitrile copolymer), polyvinyl carbamates (e.g., polyvinyl N-octadecyl carbamate), fluorocarbon polymers, and amines. Preferably, the release layer is achromic so that it does not impart color to the color-matching article. Preferably, the components in the low adhesion backsize layer do not migrate or contaminate the paint preparation area. Examples of low adhesion backsize materials are reported, for example, in Chapters 23–24 of Satas, *Handbook of Pressure Sensitive Adhesive Technology*, $2^{nd}$ Edition, 1989, Van Nostrand Reinhold (ISBN 0-442-28026-2).

Figure 4:
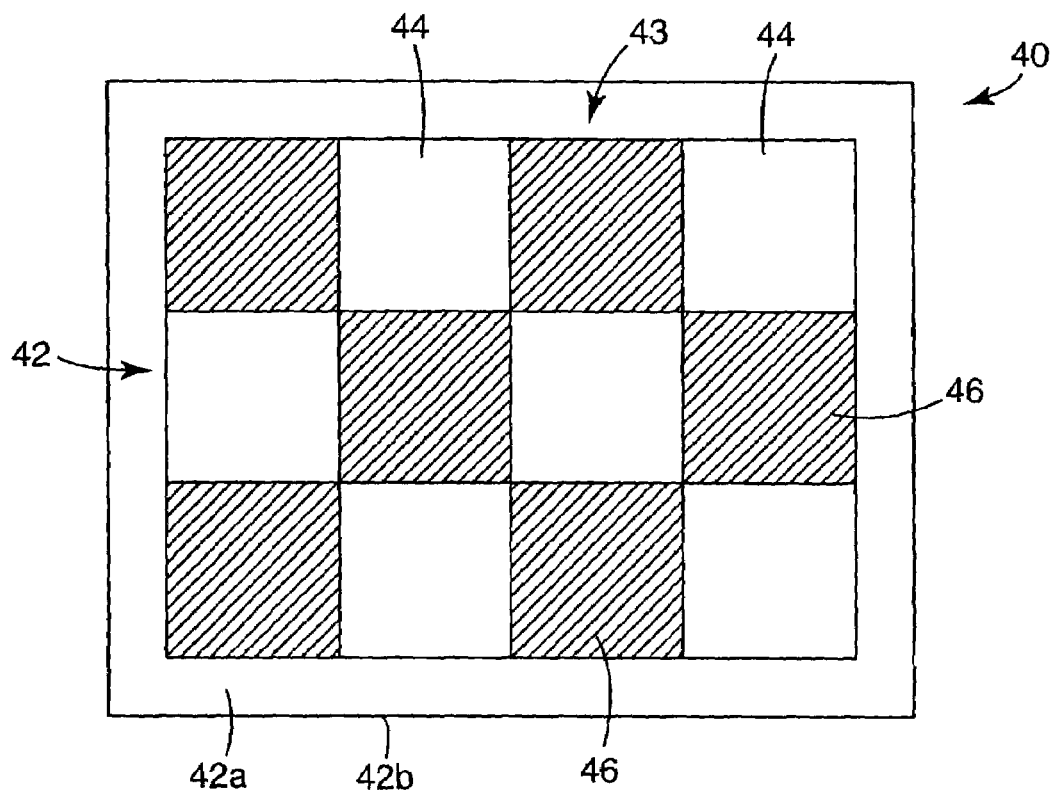
FIG. 4 is a top view of a spray-out card.

Referring to FIG. 4, an embodiment of a spray-out card 40 is shown. Spray-out card 40 provides a uniform surface for applying a color coat formulation that is to be color-matched to a target substrate (e.g., a motor vehicle). Spray-out card 40 includes backing 42 having first major surface 42a and second major surface 42b. First major surface 42a is provided with a checkerboard-type pattern 43 of alternating white squares 44 and black squares 46. The checkerboard pattern 43 provides guidance to the painter in determining the thickness of color coat that is required for effective coverage of a surface. That is, color coat is preferably applied to the surface of the spray-out card 40 until the checkerboard-type pattern 43 is no longer visible. It is understood that the spray-out card may display any suitable contrasting colors and/or contrasting pattern and may, in some instances, display a pattern-free, single color surface (e.g., a white surface). A suitable spray-out card is commercially available as Form 72 from Leneta Company (Mahwah N.J.)

Figure 5:
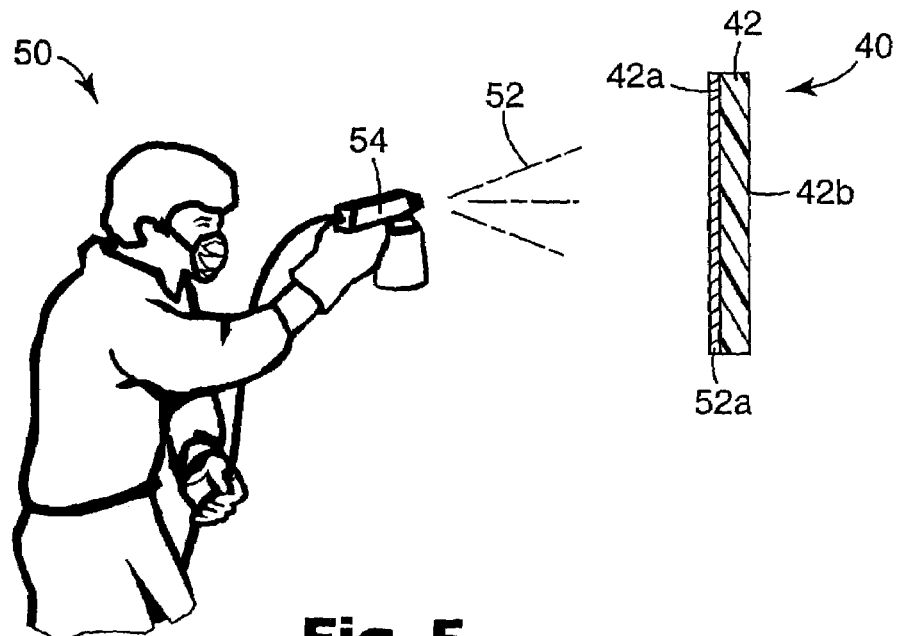
FIG. 5 is a perspective view showing a painter applying a color coat to the spray-out card of FIG. 4.
Figure 6:
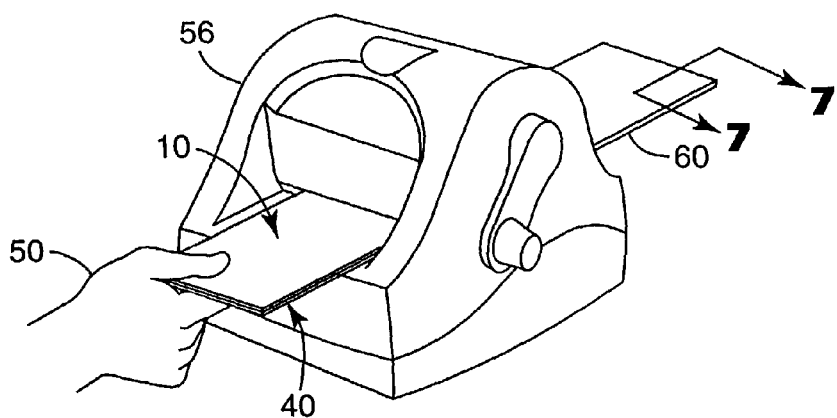
FIG. 6 is a perspective view of a painter adhesively bonding a clear coat simulation film to the color coated spray-out card of FIG. 5 to form a color-matching article.
Figure 7:
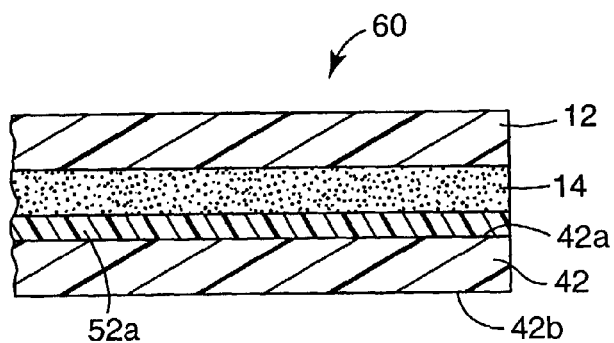
FIG. 7 is a side view of one embodiment of a color-matching article.

In the method of the present invention a color coat formulation is first prepared, preferably so that it closely approximates the color of the target substrate to be painted. The color coat may be formulated, for example, with reference to paint codes that are provided with the motor vehicle or with reference to color chips that are provided by the paint supplier. FIG. 5 illustrates painter 50 applying color coat 52 with a pressurized spray gun 54 to the first major surface 42a of spray-out card 40 to form color coat layer 52a. Typically, color coat layer 52a is then allowed to dry. After color coat layer 52a has dried, clear-coat simulation film 10 is adhesively bonded to the painted layer 52a of the spray-out card 40 with adhesive layer 14. Preferably, clear coat simulation film 10 is adhesively bonded to color coat layer 52a without forming bubbles, wrinkles, or other defects that may deleteriously affect viewing of the color coat layer 52a. Adhesive bonding of the clear coat simulation film 10 to the painted layer 52a on the spray-out card 40 may be assisted, for example, by use of a hand-held roller, squeegee, or a portable lamination device, for example, the portable lamination device available under the trade designation "XYRON 510" (Part Number XRN510ATPS) from Xyron, Inc. (Scottsdale, Ariz.). FIG. 6 illustrates painter 50 adhesively bonding clear coat simulation film 10 to the color coat layer 52a on spray-out card 40 using portable lamination device 56 to form color-matching article 60 having the structure as shown in FIG. 7.

Figure 8:
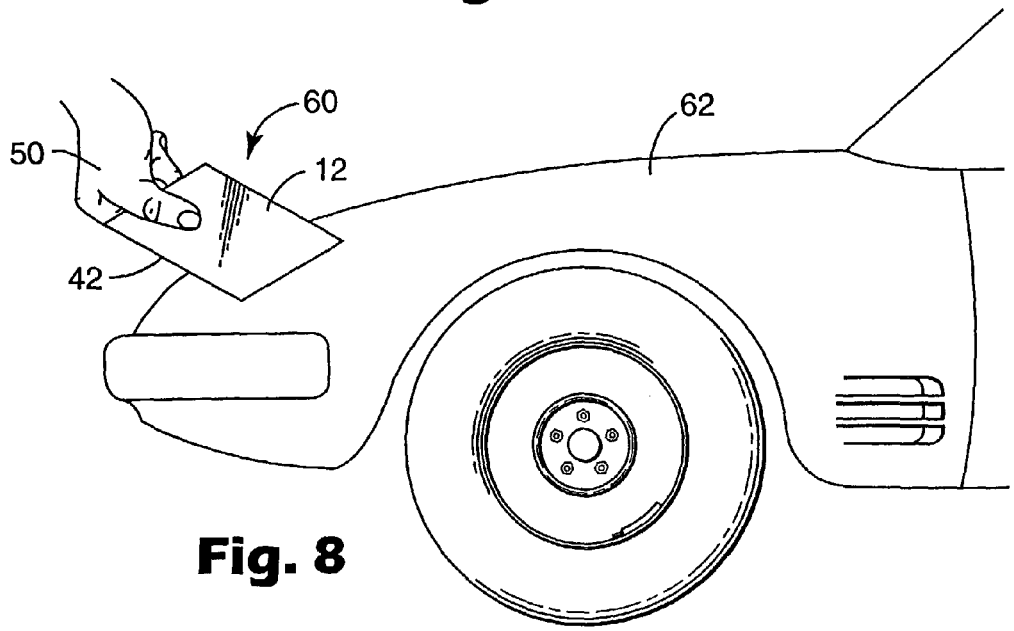
FIG. 8 is a perspective view showing a painter visually comparing a color-matching article of the present invention to a target substrate.

Once the clear coat simulation film 10 has been adhesively bonded to color coat layer 52a, the painter then views color coat layer 52a through the clear coat simulation film 10 in order to determine if the color coat formulation is an acceptable match with the target substrate. FIG. 8 illustrates painter 50 comparing color-matching article 60 with target substrate 62. Typically, the color-matching article 60 is placed in close proximity to the target substrate 62 and is viewed at various angles and under various lighting conditions.

In certain embodiments of the present invention, the second major surface 42b of spray-out card 40 may be provided with a layer pressure sensitive adhesive for adhering the spray-out card or the color-matching article to a surface. For example, the pressure sensitive adhesive may be used to temporarily adhere the spray-out card onto a surface of a spray booth in order to facilitate the application of color coat to surface 42a of spray-out card 40. In addition, it may be desirable to temporarily adhere the color-matching article 60 to a surface in order to view the color-matching article 60 at various angles and/or distances. For example, it may be desirable to adhere the color-matching article 60 to one or more body panels of the motor vehicle under repair to determine if the color coat is an acceptable match for the vehicle. Representative examples of pressure sensitive adhesives include acrylics, natural or synthetic rubber and the like. The pressure sensitive adhesive should be capable of reliable adhesion and clean removal from substrates. One preferred pressure sensitive adhesive is commercially available as "9871" from 3M Company. This pressure sensitive adhesive is provided in the form of a transfer tape (i.e., an a pressure sensitive adhesive interposed between two release liners) and has a high-tack surface on one side of the adhesive and a low-tack surface on the opposite side of the adhesive. The high tack surface of the adhesive is adhered to major surface 42b of spray-out card 40 leaving the low-tack surface for adhering to substrates as described above.

Components making-up a clear coat simulation film are described in more detail below.

The base film layer of the clear coat simulation film typically comprises a polymer film, for example, polyester, polycarbonate, acrylic, polyurethane, ionomeric polymers (e.g., SURYLN from DuPont Co.), cellulose acetate butyrate, polyolefin, ethylene vinyl acetate, biaxially oriented polypropylene, polyvinyl chloride, polystyrene, urethane acrylate, epoxy, epoxy acrylate, and blends thereof. A preferred base film layer is polyester or biaxially oriented polypropylene.

In certain embodiments the base film is transparent and achromic (i.e., colorless). For example, the base film layer has a percent haze that is less than about 5%, more preferably less than about 1.5%, and most preferably less than about 0.5% (when tested in accordance with ASTM D1003-77). Preferably, the base film layer is achromic, having $\Delta a^*$ and $\Delta b^*$ values measured using the Commission Internationale de l'Eclairage (CIE) 1976 ($L^*$ $a^*$ $b^*$) color scale (i.e., CIELAB scale) that are less than about 1.0 and 1.0, respectively, more preferably less than about 0.25 and 0.25, respectively. Values of $\Delta a^*$ and $\Delta b^*$ may be measured, for example, using a Model 530 spectrophotometer (D65 illuminant and a 10 degree observer angle, available from X-Rite, Inc., Grandville, Mich.) in reflectance mode with the base film placed over the white reference tile supplied with the spectrophotometer.

In certain embodiments the base film layer has a thickness from about 0.5 to 10.0 mils (12 µm to 250 µm), preferably from about 1.0 to 5.0 mils (25 µm to 125 µm), and more preferably from about 1.5 to 2.5 mils (37 µm to 62 µm).

Examples of films suitable for use as the base film layer include those available under the designations "HOSTAPHAN 4 LAM" and "HOSTAPHAN 4TLO" (available from Mitsubishi Polyester Films, Greer, S.C.); "QUESTAR AL-101" and "QUESTAR AG-104"(available from Filmquest Inc., St. Charles, Ill.); Experimental Product # 150-4-9 (from Felix Schoeller Technical Papers, Inc., Pulaski N.Y.) and "3M GC3480 INKJET TRANSPARENCY FILM" (from 3M Company, St. Paul, Minn.).

The adhesive layer adhesively-bonds the transparent base film to the painted spray-out card. Preferably, the adhesive layer is achromic (i.e., colorless) and transparent so that it does not alter the color or appearance of the paint that is viewed through the color-matching article.

In certain embodiments, the adhesive layer has a percent haze that is less than about 5%, more preferably less than about 1.5%, and most preferably less than about 0.5% when tested in accordance with ASTM D1003-77. Preferably, the adhesive layer is achromic having $\Delta a^*$ and $\Delta b^*$ values measured using the Commission Internationale de l'Eclairage (CIE) 1976 ($L^*a^*b^*$) color scale (i.e., CIELAB scale) that are less than about 1.0 and 1.0, respectively, more preferably less than about 0.25 and 0.25, respectively. Values of $\Delta a^*$ and $\Delta b^*$ may be measured, for example, using a Model 530 spectrophotometer (D65 illuminant and 10 degree standard observer angle, from X-Rite, Inc., Grandville, Mich.) in reflectance mode with the base film and adhesive layer placed over a white reference tile supplied with the instrument.

In certain embodiments the adhesive layer is a pressure sensitive adhesive. Suitable pressure sensitive adhesives include, for example, acrylics (e.g., solvent cast, water based latex or 100% solids systems that are thermally cured, UV cured, or e-beam cured acyrlics), rubbers (e.g., thermoplastic, block copolymers, natural rubber or silicone rubber), polyolefins (ethylene vinyl acetate polymers, poly-alpha olefins ($C_3$–$C_{10}$) copolymers, or blends/mixtures thereof.

In certain embodiments, the pressure sensitive adhesive on the clear coat simulation film is formulated to be easily removable from the color coat so that the clear coat simulation film may be removed from the spray-out card. Removable acrylic pressure sensitive adhesives may be formulated by one of skill in the art by selecting appropriate acrylic monomers. Common removable adhesive can include homopolymers of isooctyl acrylate crosslinked with an interpenetrating network of a multi-functional acrylate. A common multifunctional acrylate includes 1,6-hexanediol diacrylate. Such adhesives may be polymerized, for example, using a free-radical photoinitiator (e.g., the initiator sold under the trade designation "IRGACURE 651" from Ciba-Geigy Company) and ultraviolet light. Examples of removable acrylic pressure sensitive adhesives are described in U.S. Pat. No. 6,235,387 (Bennett et al.).

Stress relaxation is a property that is indicative of the viscoelastic flow of an adhesive. Adhesives with little or no flow properties relax less than about 15% of the applied stress. In certain embodiments the adhesive has a stress relaxation value that ranges from about 15% to about 100%, more preferably ranging from about 15% to about 60% when measured at about 23° C. and about 50% relative humidity according to the following equation:

% Stress Relaxation=(initial load–load after 120 sec)×100/initial load.

Procedures for measuring stress relaxation of adhesives are reported in WO 00/24575 (Janssen et al.).

Generally, it is desirable for the adhesive to have a smooth bonding surface. A smooth bonding surface may be provided, for example, by using a smooth paper release liner or a polymer film-based release liner, for example, a silicone coated polyester release liner. An example of a polymer film based release liners includes "100 GA POLY C/W WITH SR" (available from CP Films, Inc, Martinsville, Va.).

In certain embodiments the adhesive may be provided with a textured (e.g., microstructured) bonding surface designed to aid in the formation of wrinkle-free and bubble-free laminates with the spray-out card. Textured adhesives are reported, for example, in PCT Publication No. WO 00/69985 (Mikami et al.). Preferably, the adhesive should flow-out so that the texture is coalesced. When adhesively bonded, the color-matching article should approximate the texture of an automotive clear-coat with some amount of "orange-peel" being acceptable in the adhesive.

In certain embodiments, the adhesive layer has a thickness ranging from about 5 µm to about 150 µm, more preferably ranging from about 10 µm to about 50 µm, and most preferably ranging from about 25 µm to about 50 µm.

The adhesive layer may be pre-applied to the second major surface of the clear coat simulation film or the adhesive may be supplied to the painter in the form of an adhesive transfer tape (i.e., a layer of adhesive supplied on a release liner) for application by the painter. Examples of adhesive transfer tapes include the transfer tape commercially available under the trade designation "8142" (from 3M Company, St. Paul, Minn.).

In certain embodiments, the clear coat simulation film includes a protective overlay sheet over the first major surface of the transparent base film to protect the base film from paint overspray and/or damage, for example, during lamination of the color-matching article to the spray-out card. The protective overlay sheet may comprise paper or polymer film and typically includes a coating of a low-tack pressure sensitive adhesive applied over at least a portion of one major surface. The low-tack adhesive releasably attaches the protective overlay sheet to the base film layer. Examples of materials that may be suitable as protective overlay sheets include the products known under the trade designations "2070 SAFE-RELEASE", "2090 LONG MASK" and "3M WELDING AND SPARK DEFLECTION PAPER" (all commercially available from 3M Company, St. Paul, Minn.). It is understood that other means of releasably attaching the protective overlay sheet to the color-matching article may also be employed, for example, mechanical attachment devices such as paper clips and the like.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method for simulating a clear coat applied over a color coat for use in color-matching a color coat formulation to the color of a motor vehicle to be painted, the method comprising the steps of:
    (a) providing a spray-out card having a first major surface and second major surface;
    (b) applying a color coat to the first major surface of the spray-out card to form a color coat layer;
    (c) providing a clear coat simulation film comprising a transparent base film and a pressure sensitive adhesive wherein the pressure sensitive adhesive has a stress relaxation value that ranges from about 15% to about 100%;
    (d) adhering the transparent base film of the clear coat simulation film to the color coat layer with the pressure sensitive adhesive to form a color-matching article;
    (e) visually comparing the color-matching article with the motor vehicle to be painted.

2. The method of claim 1, further including the step of: drying the color coat layer.

3. The method of claim 1, wherein the transparent base film is polyester or biaxially oriented polypropylene.

4. The method of claim 1, wherein the transparent base film has a percent haze that is less than about 0.5%.

5. The method of claim 1, wherein the pressure sensitive adhesive has a percent haze that is less than about 0.5%.

6. The method of claim 1, wherein the pressure sensitive adhesive is a removable pressure sensitive adhesive.

7. The method of claim 1, wherein the transparent base film has a $\Delta a^*$ of less than about 0.25 and a $\Delta b^*$ of less than about 0.25.

8. The method of claim 1, wherein the spray-out card further includes a pressure sensitive adhesive applied to the second major surface of the spray-out card.

9. The method of claim 8, further including the step of: adhering the spray-out card to a motor vehicle with the pressure sensitive adhesive.

10. A color-matching article produced by the method of claim 1.

* * * * *

UNITED STATES PATENT AND TRADEMARK OFFICE
CERTIFICATE OF CORRECTION

PATENT NO. : 6,995,843 B2  
DATED : February 7, 2006  
INVENTOR(S) : Janssen, Jeffrey R.

It is certified that error appears in the above-identified patent and that said Letters Patent is hereby corrected as shown below:

Column 1,  
Line 31, before "fluid" delete "an" and insert -- a --.  
Line 31, delete "thiner" and insert -- thinner --.  
Line 47, after "may be" insert -- or --.

Column 5,  
Line 10, after "i.e.," delete "an".

Signed and Sealed this

Sixteenth Day of May, 2006

JON W. DUDAS  
*Director of the United States Patent and Trademark Office*